(12) United States Patent
Herley et al.

(10) Patent No.: US 7,516,418 B2
(45) Date of Patent: Apr. 7, 2009

(54) AUTOMATIC TRACKING OF USER DATA AND REPUTATION CHECKING

(75) Inventors: Cormac E. Herley, Bellevue, WA (US); Dinei A. Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/421,724

(22) Filed: Jun. 1, 2006

(65) Prior Publication Data

US 2007/0282832 A1   Dec. 6, 2007

(51) Int. Cl.
*G06F 3/048*   (2006.01)
*G06F 3/03*   (2006.01)

(52) U.S. Cl. .................. 715/816; 715/225; 715/241; 715/258; 715/507; 707/3; 707/4; 707/5; 707/6; 707/7

(58) Field of Classification Search .......... 715/507, 715/816, 225, 241, 258; 707/3, 4, 5, 6, 7
See application file for complete search history.

(56) References Cited

U.S. PATENT DOCUMENTS

| | | | | |
|---|---|---|---|---|
| 5,544,048 A | * | 8/1996 | Dugan et al. | 715/210 |
| 5,640,577 A | * | 6/1997 | Scharmer | 715/235 |
| 5,666,502 A | * | 9/1997 | Capps | 715/811 |
| 5,712,979 A | * | 1/1998 | Graber et al. | 709/224 |
| 5,724,457 A | * | 3/1998 | Fukushima | 382/311 |
| 5,727,129 A | * | 3/1998 | Barrett et al. | 706/10 |
| 5,764,906 A | * | 6/1998 | Edelstein et al. | 709/219 |
| 5,892,919 A | * | 4/1999 | Nielsen | 709/228 |
| 5,895,471 A | * | 4/1999 | King et al. | 707/104.1 |
| 5,896,321 A | * | 4/1999 | Miller et al. | 365/189.15 |
| 5,960,114 A | * | 9/1999 | Dauerer et al. | 382/229 |
| 5,960,429 A | * | 9/1999 | Peercy et al. | 707/5 |
| 6,012,093 A | * | 1/2000 | Maddalozzo et al. | 709/223 |
| 6,041,323 A | * | 3/2000 | Kubota | 707/5 |
| 6,052,730 A | | 4/2000 | Felciano et al. | |
| 6,084,585 A | * | 7/2000 | Kraft et al. | 715/733 |
| 6,088,700 A | * | 7/2000 | Larsen et al. | 707/10 |
| 6,094,665 A | * | 7/2000 | Lyons et al. | 715/234 |

(Continued)

OTHER PUBLICATIONS

Google Patents et al. "Google Text Search—Predicted Result", May 2008.*

(Continued)

*Primary Examiner*—Steven B Theriault
(74) *Attorney, Agent, or Firm*—Amin, Turocy & Calvin, LLP

(57) ABSTRACT

A unique system and method that facilitate automatic tracking of user data and providing on-demand site or merchant reputation information is provided. The system and method involve monitoring user input such as by keystrokes over a period of time and forming a long continuous string of characters. The string of characters can be monitored for repeating substrings or non-repeating substrings that indicate sensitive user information such as SSN or credit card number (CCN). The substrings can be displayed to the user in a digest form and order according to frequency of occurrence, for example. Thus, the user can readily view where and when their sensitive information has been entered. In addition, the typing of certain substrings such as CCNs or other sensitive field data can trigger a reputation service to retrieve the reputation data for the current site or merchant to mitigate dealing with fraudulent sites or merchants.

20 Claims, 10 Drawing Sheets

U.S. PATENT DOCUMENTS

| | | | |
|---|---|---|---|
| 6,208,339 B1* | 3/2001 | Atlas et al. | 715/780 |
| 6,314,439 B1* | 11/2001 | Bates et al. | 715/209 |
| 6,366,298 B1 | 4/2002 | Haitsuka et al. | |
| 6,453,280 B1* | 9/2002 | Yang | 704/10 |
| 6,460,038 B1* | 10/2002 | Khan et al. | 707/10 |
| 6,560,640 B2* | 5/2003 | Smethers | 709/219 |
| 6,564,213 B1* | 5/2003 | Ortega et al. | 707/5 |
| 6,611,881 B1 | 8/2003 | Gottfurcht et al. | |
| 6,631,496 B1* | 10/2003 | Li et al. | 715/200 |
| 6,662,340 B2* | 12/2003 | Rawat et al. | 715/236 |
| 6,671,856 B1* | 12/2003 | Gillam | 715/210 |
| 6,725,227 B1* | 4/2004 | Li | 707/102 |
| 6,734,886 B1* | 5/2004 | Hagan et al. | 715/853 |
| 6,741,235 B1* | 5/2004 | Goren | 345/173 |
| 6,768,991 B2* | 7/2004 | Hearnden | 707/5 |
| 6,810,414 B1* | 10/2004 | Brittain | 709/219 |
| 6,829,607 B1* | 12/2004 | Tafoya et al. | 707/6 |
| 6,836,801 B1 | 12/2004 | Parrish et al. | |
| 6,877,007 B1 | 4/2005 | Hentzel et al. | |
| 6,879,736 B1* | 4/2005 | Satomi | 382/295 |
| 6,928,623 B1* | 8/2005 | Sibert | 715/783 |
| 6,934,767 B1* | 8/2005 | Jellinek | 709/247 |
| 6,957,224 B1* | 10/2005 | Megiddo et al. | 707/102 |
| 6,964,020 B1* | 11/2005 | Lundy | 715/210 |
| 6,981,028 B1* | 12/2005 | Rawat et al. | 709/217 |
| 7,003,727 B2* | 2/2006 | Rosar | 715/741 |
| 7,043,700 B1* | 5/2006 | Bertram et al. | 715/811 |
| 7,130,923 B2* | 10/2006 | Mason | 709/245 |
| 7,136,490 B2* | 11/2006 | Martinez et al. | 380/284 |
| 7,167,901 B1* | 1/2007 | Beadle et al. | 709/207 |
| 7,185,271 B2* | 2/2007 | Lee et al. | 715/226 |
| 7,185,272 B2* | 2/2007 | Pearce et al. | 715/207 |
| 7,216,292 B1* | 5/2007 | Snapper et al. | 715/236 |
| 7,254,569 B2* | 8/2007 | Goodman et al. | 707/1 |
| 7,322,023 B2* | 1/2008 | Shulman et al. | 717/112 |
| 7,346,652 B2* | 3/2008 | Berrigan et al. | 709/203 |
| 7,430,719 B2* | 9/2008 | Pettinati et al. | 715/739 |
| 7,451,398 B1* | 11/2008 | Rohrs | 715/271 |
| 2002/0004783 A1* | 1/2002 | Paltenghe et al. | 705/41 |
| 2002/0013834 A1 | 1/2002 | Esakov et al. | |
| 2002/0105542 A1* | 8/2002 | Rosar | 345/741 |
| 2002/0138445 A1* | 9/2002 | Laage et al. | 705/67 |
| 2002/0143925 A1 | 10/2002 | Pricer et al. | |
| 2003/0018585 A1* | 1/2003 | Butler et al. | 705/53 |
| 2003/0115111 A1* | 6/2003 | Fisher | 705/26 |
| 2003/0188171 A1 | 10/2003 | DeCenzo et al. | |
| 2004/0254928 A1* | 12/2004 | Vronay et al. | 707/5 |
| 2005/0050472 A1* | 3/2005 | Faseler et al. | 715/734 |
| 2005/0131686 A1* | 6/2005 | Yamamoto et al. | 704/231 |
| 2006/0020813 A1 | 1/2006 | Birk et al. | |
| 2006/0048074 A1* | 3/2006 | Klein | 715/811 |
| 2006/0059434 A1* | 3/2006 | Boss et al. | 715/780 |
| 2006/0106769 A1* | 5/2006 | Gibbs | 707/3 |
| 2006/0129929 A1* | 6/2006 | Weber et al. | 715/538 |
| 2006/0168509 A1* | 7/2006 | Boss et al. | 715/507 |
| 2006/0242109 A1* | 10/2006 | Pereira et al. | 707/1 |
| 2006/0253458 A1* | 11/2006 | Dixon et al. | 707/10 |
| 2007/0033166 A1* | 2/2007 | Trowbridge et al. | 707/3 |
| 2007/0283254 A1* | 12/2007 | Hamzy | 715/533 |
| 2008/0005342 A1* | 1/2008 | Schneider | 709/230 |
| 2008/0010253 A1* | 1/2008 | Sidhu et al. | 707/3 |
| 2008/0015925 A1* | 1/2008 | Sundaresan | 705/10 |
| 2008/0065617 A1* | 3/2008 | Burke et al. | 707/5 |
| 2008/0066020 A1* | 3/2008 | Boss et al. | 715/968 |
| 2008/0109553 A1* | 5/2008 | Fowler | 709/229 |

OTHER PUBLICATIONS

Google Patents et al. "Google Text Search—Autocomplete, html and form", May 2008.*
Eastlake, Donald, et al. "Electronic Commmerce Modeling Language ECML version 2 <draft-ietf-trade-ecml2-spec-13.txt>" Oct. 2004.*
Ranjan, Nisheeth et al. "Using supervised learning to improve URL ordering in Autocomplete", Dec. 27, 2004.*
www.smartcell.com et al. "TextPlus for PALM OS". Feb. 28, 2006.*
Change et al. "IEPAD: Information Extraction based on Pattern Discovery". Jan. 1, 2001.*
Hanson et al. "A brief Introduction to Icon", Jan. 1, 1993.*
Jing, Tao et al. "An Efficientweb traversal pattern Mining Algorithm based on Suffix Array" Aug. 26, 2004.*
Joshi, Amruta et al. "Keyword Generation for Search Engine Advertising", Proceedings of the Sixth IEEE conference on Data mining—Workshops 2006.*
Chang, "IEPAD: Information Extraction based on Pattern Discovery", Jan. 1, 2001.
Hanson, "A brief introduction to Icon", Jan. 1, 1993.
Jing, "An efficient Web traversal pattern mining algorithm based on . . . ", Aug. 26, 2004.
Joshi, "Keyword generation for search engine advertising".
Tabulus. "Content Sentiner" http://www.tablus.com/page.php?id=149 last viewed Mar. 14, 2006, 2 pages.
Palisade Systems, Inc. "PacketSure" http://www.palisadesys.com/products/packetsure/ last viewed Mar. 14, 2006, 1 pages.
Browsereport. "Internet Usage Reporting and Monitoring to Track Web Sites Visited by Users" http://www.codework.com/breporter/product.html last viewed Mar. 13, 2006, 1 pages.

* cited by examiner

FIG. 3

*Abc baby online shop*

SHIPPING INFORMATION

| | |
|---|---|
| FIRST NAME | MARY JANE |
| LAST NAME | BROWN |
| ADDRESS #1 | 555 SYCAMORE LANE |
| ADDRESS #2 | |
| CITY, STATE, ZIP | REDMOND, WA 98052 |

[Shipping information form screenshot:

Abc baby online shop

SHIPPING INFORMATION

FIRST NAME: MARY JANE
LAST NAME: BROWN
ADDRESS #1: 555 SYCAMORE LANE
ADDRESS #2:
CITY, STATE, ZIP: REDMOND, WA 98052]

CAPTURED INPUT FROM THIS SCREEN FORMED INTO A STRING OF CHARACTERS:
MARYJANEBROWN555SYCAMORELANEREDMONDWA98052

ADD THIS STRING TO THE GROWING STRING OF CHARACTERS FORMED FROM INPUT ENTERED DURING THE DESIGNATED TIME PERIOD

FIG. 5

AUTOMATIC TRACKING OF USER DATA AND REPUTATION CHECKING

BACKGROUND

The World Wide Web ("web") has become a valuable resource and source of vastly different types of information. For corporate or individual consumer users, it can be used as a reference guide for important stock information in real time, current traffic or weather information, health and medical, consumer goods, available real estate, personal and commercial banking, and the news as it is reported from all around the world. In addition, many users have also come to rely on the web for commerce. Some stores exist on the web only to reduce overhead costs while others have added a web counterpart to expand their businesses electronically. However, it may easily be forgotten that the web also includes a significant amount of user information based on a user's web activity. In particular, some web users have grown accustomed to entering their name or other personally identifiable information (PII) whenever requested by a web page or site. Unfortunately, this can become troublesome for the user such as by making the user more vulnerable to phishing schemes or any other schemes that relate to and result in identity theft.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate tracking and maintaining a record of where personally identifiable information (PII) has been entered into a browser (e.g., web or network browser)—while the browser has focus—for any web or network user. More specifically, the system and methodology can automatically determine which entered data appears to be the most important to the user and can record where this data has been entered online. This can be accomplished in part by monitoring or extracting data that has been entered onto a browser page or site as one continuous string of characters for a determined length of time. For example, a user may visit 100 different web sites over a 6-month period. Characters that have been entered by typing or otherwise on any of the web sites can be extracted as a continuous string of characters. This string can be analyzed in part to locate repeating substrings. Substrings that are entered frequently and thus repeat more often than others can be considered to have greater importance to the user. Thus, substrings having a length of at least p characters (e.g., p is equal to or greater than one) and that are detected at least q times (e.g., q is equal to or greater than one) can be captured for analysis.

Certain character strings such as credit card numbers, for example, have a unique number of characters or digits (e.g., 15 for American Express® or 16 for VISA cards) and parity information that allows them to be identified as credit card numbers. For example, when the substring is 15 or 16 digits in length and the check sum is valid, the system and/or method can presume that a purchase transaction is about to occur and as a result, can call a reputation service for the current website. The reputation service can provide the available reputation information for the website to the user almost immediately. When provided before the transaction is completed, the user can reconsider the transaction as needed. Otherwise, the user can alert his credit card company of the charge if the reputation information indicates a fraudulent or otherwise untrustworthy site.

Substrings can be ordered based on their frequency of occurrence or in the alternative, according to their contextual meanings. The contextual meaning of a particular substring can be determined in part by the metatag data associated with a web form field in which the string is entered. Thus, the substrings can be identified and then ordered accordingly based on their content. For example, the repeating string PAUL that is extracted from an html form field with the metatag FIRST can be identified as the first name of the user.

Various user interfaces can be employed to display this information to the user. For example, the user can view a digest of the substrings by alphabetical order or by frequency of occurrence and then click on any one substring to obtain a listing of web pages or sites wherein the substring has been entered. Alternatively, the user interface can display the information by site or page followed by the relevant substrings. Default settings can include a listing of substrings ordered by count or frequency but other sorting methods can be employed as well such as by date, alphabetical order, or by sites that have been bookmarked by the user or saved as a favorite or preferred page. In addition to being browsable, the digest can also be searchable.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 is an exemplary user interface of a screen requesting a user's shipping address.

FIG. 4 is an exemplary user interface of the screen in FIG. 3, in which the user has entered shipping address information into the respective fields.

FIG. 5 demonstrates an extraction of the data entered in FIG. 4.

DETAILED DESCRIPTION

Figure 1:
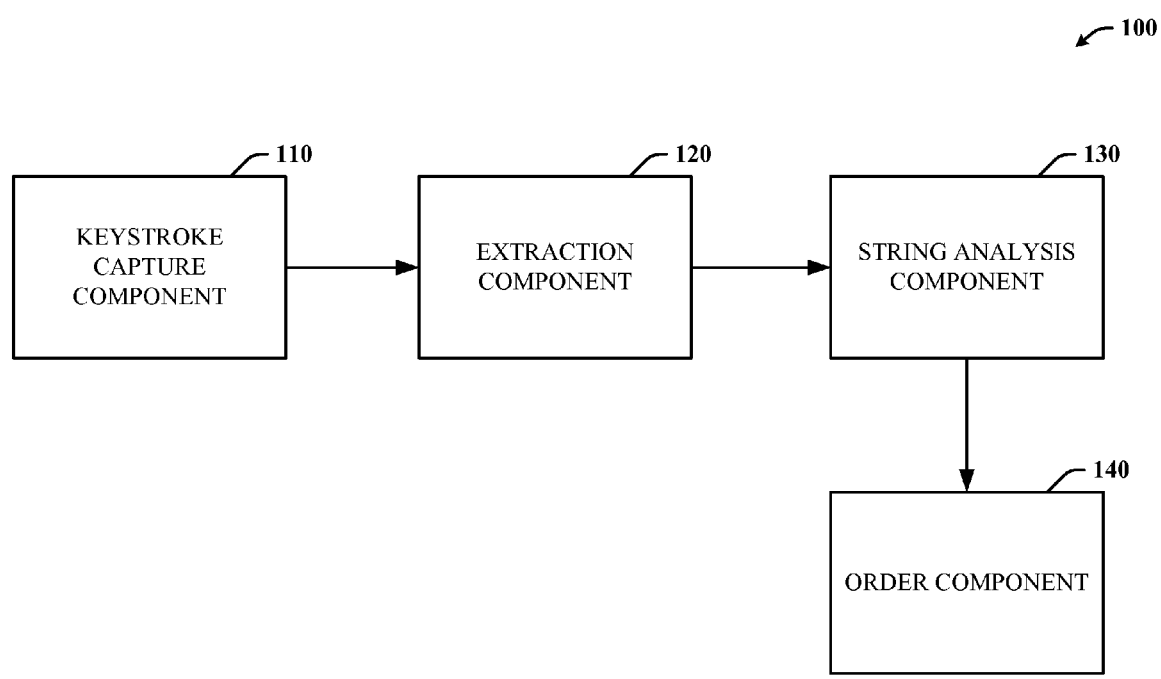
FIG. 1 is a block diagram of a system that facilitates the construction of a digest of user input entered into a web browser or other online network to track where PII data has been entered.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

Web users currently have no efficient way of summarily viewing where their PII data has been entered. They repeatedly are requested to enter their name, address, social security number, phone numbers, account numbers, usernames, credit card numbers, etc. at various websites without the ability to efficiently keep track of where their sensitive or private information is going or of readily determining the reputation of the recipient. The systems and methods described in further detail below in FIGS. 1-10 can monitor user input, automatically determine the information that is sensitive to the particular user, provide a digest of the information and where it has gone, and allow for on-the-spot checking of site or merchant reputation before sensitive information is communicated.

Referring now to FIG. 1, there is a general block diagram of a system 100 that facilitates the construction of a digest of user input entered into a web browser or other online network to track a user's PII data. The system 100 includes a keystroke capture component 110 that can catch or capture current keystrokes (and/or POST events) in the form of a long, continuous string for a designated period of time. In particular, nearly all if not all characters typed or otherwise entered into an active browser can be captured. Characters can include numbers, letters, symbols, and/or punctuation. Thus, this can include address bar entries (e.g. www.anyname.com), search engine queries, and web form entries.

Substrings of characters with a length of at least p characters can be extracted by way of an extraction component 120. In particular, extraction can be performed by suffix trees or other similar technique. Whether a substring is extracted for further analysis can be determined according to its frequency of occurrence. For example, if the substring is found to repeat at least once, then that substring can be extracted. The extraction component 120 can also employ one or more algorithms in order to detect and extract repeating substrings. If desired, certain keystrokes can be ignored or disregarded such as returns, delete, backspace, space, or other navigation related keystrokes. Previously entered characters can also be captured from html form fields as well. In addition, auto-suggest selections and auto-complete terms can be captured as these are commonly employed with respect to address bars, search query fields, and other form fields for PII data.

The extracted substrings can be analyzed by a string analysis component 130 to determine a count of the number of times each substring occurs. PII data, address bar entries typically in the form of www._____._____ (e.g., www.xnewsx.com), and search engine queries usually occur most frequently; hence PII data can be readily isolated. An order component 140 can arrange the extracted substrings by count (e.g., highest to lowest count). For example, the substring DANIEL may have the highest count of being entered 112 times over a 30-day period. This string would then appear at the top of the list. The user can click on the substring to view where and/or when the substring was entered. Without actually identifying the meaning of the substring DANIEL or what the substring refers to (e.g., that it is the user's first name), its high frequency of occurrence can indicate its relative importance to the user in terms of the user's PII data. So in this example, DANIEL can be identified as an important character string for the user to track.

Figure 2:
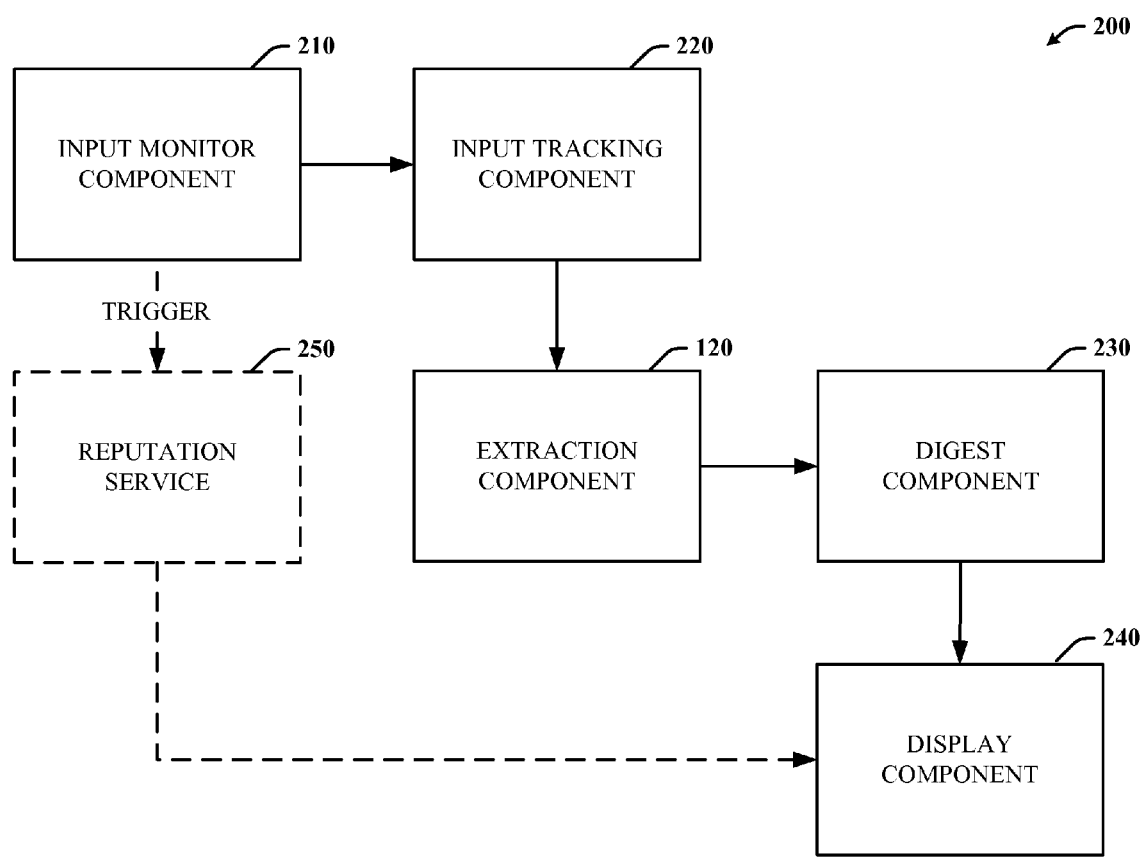
FIG. 2 is a block diagram of a system that facilitates the monitoring and tracking of PII data and the employment of on-demand site or merchant trust verification in response to the detection of certain character string data.

Referring now to FIG. 2, there is a block diagram of a system 200 that facilitates the monitoring and tracking of PII data and the employment of on-demand site or merchant trust verification in response to the detection of certain character string data. The system 200 includes an input monitor component 210 that can monitor input entered into an active browser by a user. The monitor component 210 can observe the input by forming it into a long, continuous character string. Substrings which are found to repeat at least q times can be tracked over a period of time (e.g., a number of weeks, days, months, etc.) by an input tracking component 220 and then extracted by the extraction component 120. A digest component 230 can record the extracted substrings and the respective sites or web locations where they were entered or typed. In addition, the digest component 230 can order them in a desired manner specified by the user using various metrics such as count, date of occurrence, and location. Alternatively, the substrings can be ordered with one metric and their respective locations can be ordered using another metric (assuming more than one location exists for any one substring).

A display component 240 can provide a visualization of the extracted substrings that is browsable and/or searchable. For example, the user can view the substrings by order of count with the highest count at the top of the list. To view where the substring has been entered, the user can click on the substring and then view the locations by familiarity of the location or by date of entry. This means that the user can order the list of locations by any one of the following: when the entry occurred; whether the location is bookmarked (e.g., marked as a favorite such that bookmarked locations are listed at or near the top); or whether the user has previously visited the location (e.g., new locations are listed at or near the top).

In addition to generally observing the input as it is entered by the user, the input monitor component 210 can also watch for specific kinds of input which have been deemed more sensitive to the user. For example, web or html form fields can be designated as "sensitive" if they contain sensitive information such as the user's address or first and last names. When content is entered into a "sensitive" form field, the monitor component 210 can trigger a reputation service 250 to retrieve the reputation data for the site or merchant. The reputation data can include a trustworthiness rating, other pertinent information, and/or a historical listing of the site or merchant's past reputation information. As a result, the user can view the reputation data for the site or merchant before communicating the current set of information or before sending any additional information to the site or merchant.

Alternatively, some types of input have a unique length of digits or characters. One example of such is a credit card number. Since 16-digit credit card numbers have parity information, the system 200 or a component thereof can readily determine that these character strings correspond to a credit card number. Thus, a warning can be issued to the user on a known non-reputable site even when that credit card number has never before been typed or entered into the browser.

Figure 3:
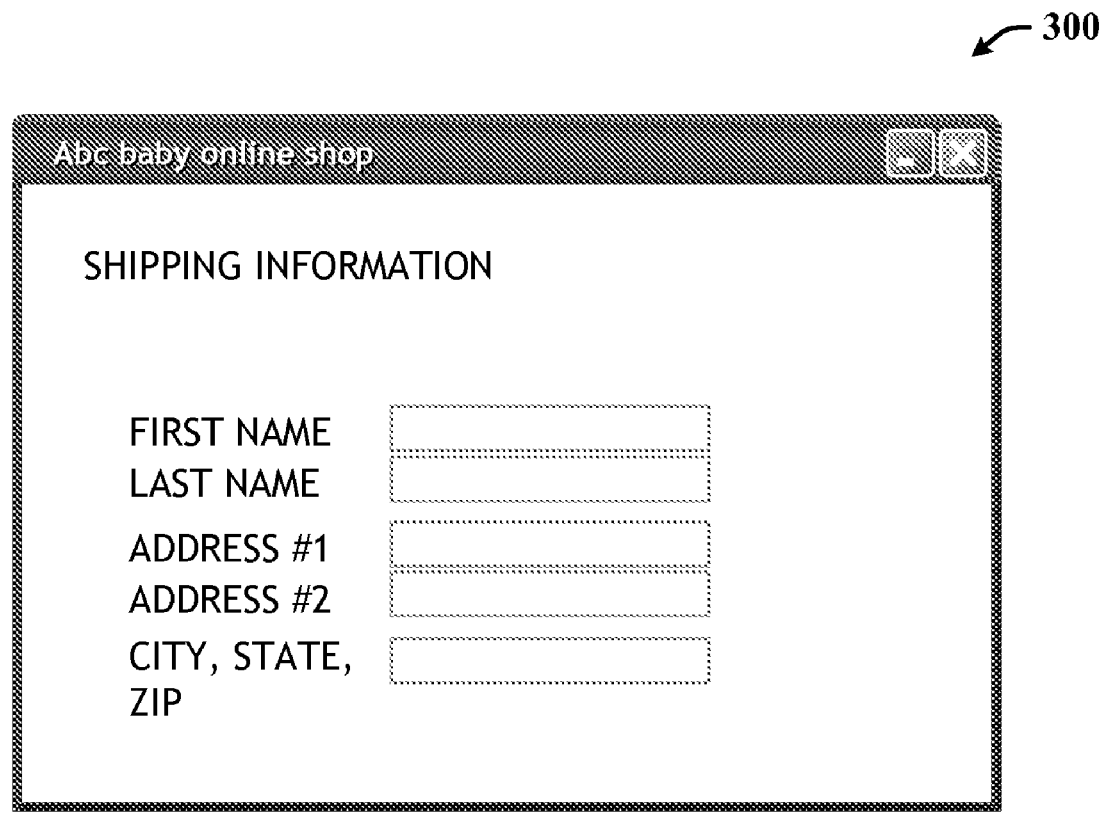

The next few diagrams as illustrated in FIGS. 3-5 demonstrate the systems 100, 200 in practice from an end-user perspective. The operations of these systems occur automatically as the user interacts with a browser. Imagine that Mary Jane Brown is shopping online and is in the process of making a purchase on /www.Abcbabyonlineshop.com/. To begin the purchasing process, she is presented with different html form fields that correspond to various elements of her shipping address information as shown in an exemplary user interface 300 in FIG. 3.

The user interface 400 in FIG. 4 results when Mary Jane has entered her information into the respective fields. As the user enters this information, the entered characters can be captured as one string of data as demonstrated in FIG. 5. This string of data can be a continuation of other characters previously entered by Mary Jane prior to reaching the Shipping Information screen. For instance, Mary Jane's keystrokes made while the browser has been in focus have been captured and the character entries have been monitored for the last 6 weeks. As the entries continue, the string of characters continues to grow as well. Therefore, the string of characters formed thus far may include several dozen instances of Mary Jane's address, her first and last names, her phone number, her credit card number, etc.

FIG. 5 illustrates one portion of the string that corresponds to this particular page of the website. One can imagine that while Mary Jane was collecting items in her shopping cart, she entered quantities for each selected items (e.g., 1—hooded jacket; 2—white shirts; 1—pants, etc.). Each of these characters that correspond to a quantity can be included in the string along with other data she has entered on this site and other sites visited during the previous 6 week time period.

When character entries have been collected and monitored over the desired period of time, an algorithm can be applied to the string of characters to find repeating substrings. Since metatag labels associated with web form fields are not necessarily relied upon to understand the context of the repeating substrings, the number of times a particular substring repeats can be employed to automatically determine which substrings refer to PII data or other sensitive information and are thus more important to the user. Hence, Mary Jane can access her digest and view which character substrings have been entered and where. The date of entries can also be provided. This can be helpful particularly in situations where an unauthorized user had access to her laptop that included her bank login information, for instance. She can select the substring that corresponds to her bank username and view when it was entered.

Figure 6:
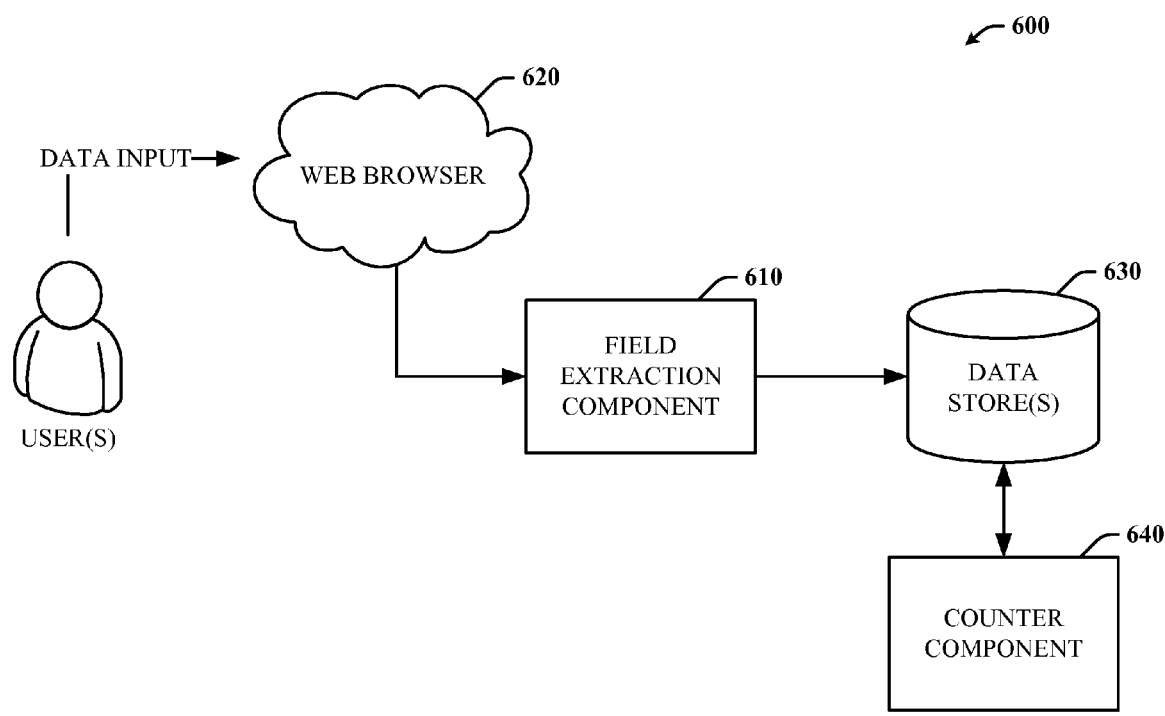
FIG. 6 is a block diagram of a system that facilitates extracting field data and field type in order to track how frequently and whereto PII data has been entered.

Turning now to FIG. 6, there is a block diagram of a system 600 that facilitates extracting field data and field type in order to track how frequently and whereto PII data has been entered. As mentioned above, metatag labels associated with web or html form fields can be extracted or utilized to determine the context of a particular substring and hence its relative importance to the user. The system 600 represents an exemplary configuration for doing so. The system 600 includes a field extraction component 610 that receives data from a web browser 620 as a user enters the data into one or more web form fields. The field extraction component 610 can extract character strings which have been entered into particular fields and associate each character string with the appropriate metatag label. These field character strings can be collected into one or more buckets or data stores 630. As additional field character strings are added to the data stores 630, a counter component 640 can maintain a count for each field character string according to the number of occurrences observed.

When displayed in digest form to the user, the metatag label can be employed to order the field character strings and/or to facilitate identifying the string content to the user. For example, imagine Mary Jane's user ID for her bank website is FOXTREE. When the monitoring of her input initially begins, FOXTREE can be added to the data store 630. With each subsequent visit to the bank website, Mary Jane enters her user ID. The count for FOXTREE can thus be increased by 1 each time it is entered on the bank website or with respect to any other site or field in the web browser.

Figure 7:
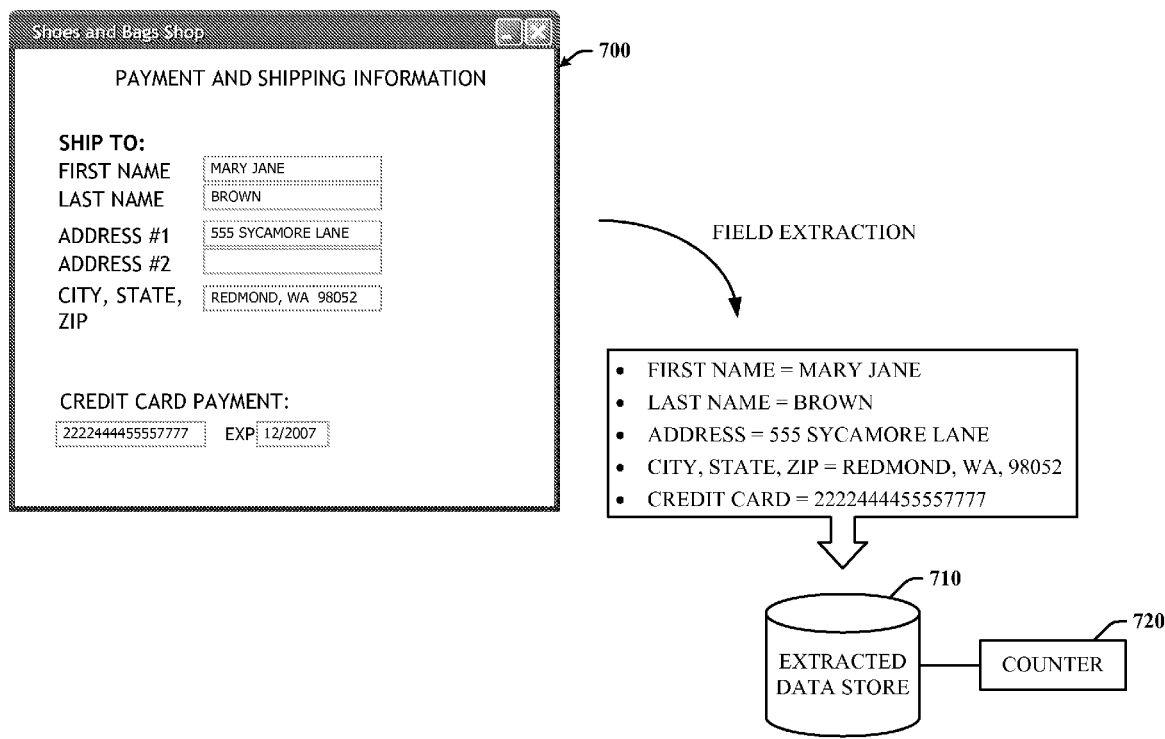
FIG. 7 demonstrates an extraction of data that has been entered into a plurality of web form fields according to the system of FIG. 6.
Figure 8:
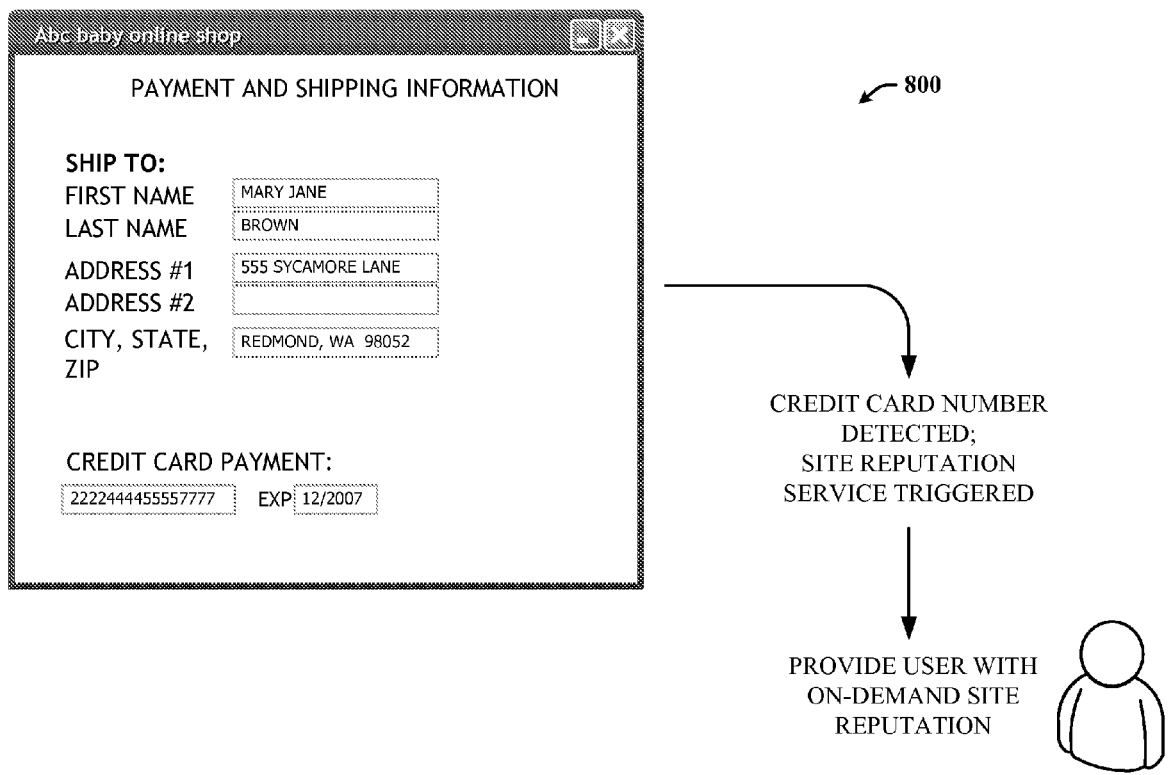
FIG. 8 demonstrates the triggering of site reputation verification or notification upon the detection of a credit card number entered by a user.

FIG. 7 demonstrates an extraction of various field data that have been entered into a plurality of web form fields according to the system 600 of FIG. 6. Continuing with Mary Jane Brown and her web activity, the diagram in FIG. 7 represents an exemplary user interface 700 for a Payment and Shipping Information screen for the Shoes and Bags Shop. Once again, Mary Jane is entering her shipping information which includes her first and last names, and address, and her payment information. Each of the different types of information corresponds to one or more form fields. "Mary Jane" is the character string in the FIRST NAME field; "Brown" is the character string in the LAST NAME field, etc. The character string data for each relevant field can be extracted as demonstrated and then stored in an extracted Each occurrence of the same character string cam be counted by a counter 720 and this count can be later used to order and/or display the character strings.

Note that in some applications, it can be beneficial to only include new items in the list where the items were typed into an HTML form. Nevertheless, even if that is that case, the recording of where the information was sent can still benefit from continuous analysis of keyboard activity. Otherwise, a malicious site may find other ways to send the information that do not include posting an html form.

The entry of some types of character strings can activate special action by the system in order to provide greater protection and awareness for the user against fraudulent websites, phishing attacks, and the like. For example, as previously discussed, credit card numbers have a unique length of 16 digits and parity information that identifies them as being credit card numbers. Thus, numeric strings of this length can be readily identified as such. The diagram 800 in FIG. 8 demonstrates the triggering of a reputation service to provide immediate or on-demand reputation information for the current site or merchant upon the detection of a credit card number. This can occur whether the credit card number has been entered before by the user or has never been entered before by the user (on this site or any other site). Therefore, when a numeric string is recognized as being a credit card number, the site or merchant reputation service can be called. Alternatively, when a financial transaction is detected or when other types of character strings are identified to indicate a financial transaction such as a billing or a shipping address or an expiration date, the reputation service can be triggered as well.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 9:
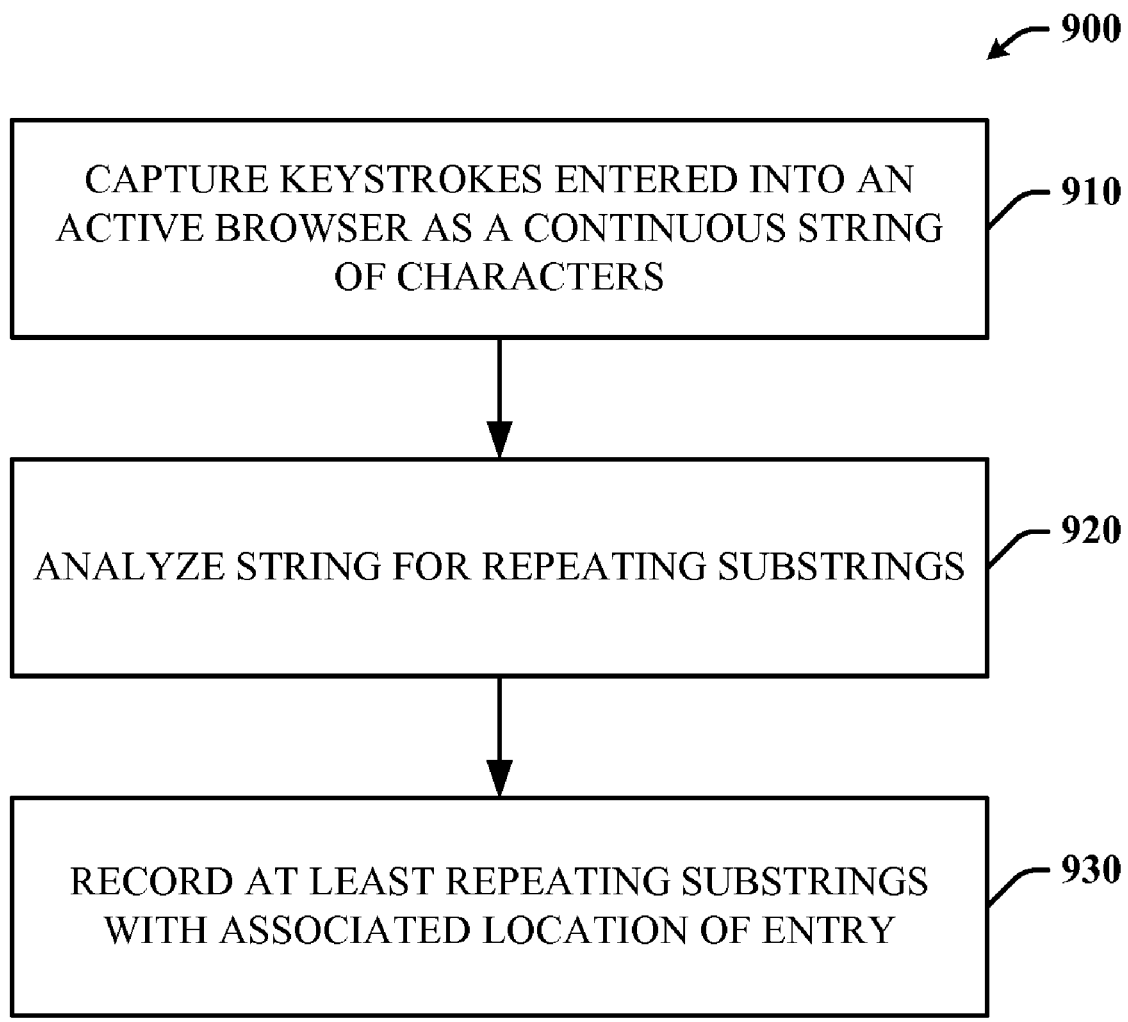
FIG. 9 is a flow diagram illustrating an exemplary methodology that facilitates constructing a digest of user input entered into a web browser or other online network for personal PII data management.

Referring now to FIG. 9, there is a flow diagram illustrating an exemplary method 900 that facilitates constructing a digest of user input entered into a web browser or other online network for personal PII data management. The method 900 involves capturing keystrokes entered into an active web browser as a continuous string of characters at 910. Substantially all keystrokes can be captured for a designated period of time. At 920, the string of characters can be analyzed in order to find one or more substrings that repeat.

A substring that is repeatedly entered on various websites or even just on one website can denote a level of importance or a sensitivity value for the user. In fact, quite often PII data is entered more frequently than most other types of data, thereby further emphasizing the need to track where PII data is typed or otherwise entered by the user or by someone else. It should be appreciated that the string of characters can be analyzed periodically as the string grows or after the designated time period in order to determine the user's PII data or other information that is sensitive to the user and that is desirable for tracking. At 930, repeating substrings such as those that repeat at least m times can be recorded along with their associated entry locations and/or times of entry for later display to the user.

The method 900 captures substantially all if not all keystrokes and characters typed or entered by the user and then makes use of one or more algorithms to find repeating substrings of at least length p. However, the context of each repeating substring may not be known by the system. Thus, the substrings can be displayed as they have been identified (or segmented) and arranged according to their frequency of occurrence. PII data and other sensitive user information can be readily identified by the user as the repeating substrings can plainly appear as the user's first name, last name, address, online account usernames or IDs, passwords presumably known only to the user, last four digits of the user's social security number, and the like.

In some cases, a substring need not repeat in order to be included in the digest. For instance, some pieces of PII data such as an account number or social security number are only entered once by the user, but due to their number of digits and/or dashes after the $3^{rd}$ and $6^{th}$ digits, the system can be trained to extract these substrings as well. Credit card numbers are 15 or 16 digits in length and contain parity information. They can also be extracted and included in the user's digest even if only entered once.

Web form fields often have metatag labels associated therewith which can be employed to identify the context of the characters entered into the particular fields. Rather than forming a long string of characters, the character strings from the respective web form fields can be individually extracted and stored. Whenever another instance of any one field character string is observed, the relevant count can be increased accordingly. As a result, character strings can be ordered based on their count and/or their particular content. For example, the user's full name may be more important to the user than just his first or last name alone. So the user's full name can appear at the top of the digest followed by occurrences of just his first or last name.

Figure 10:
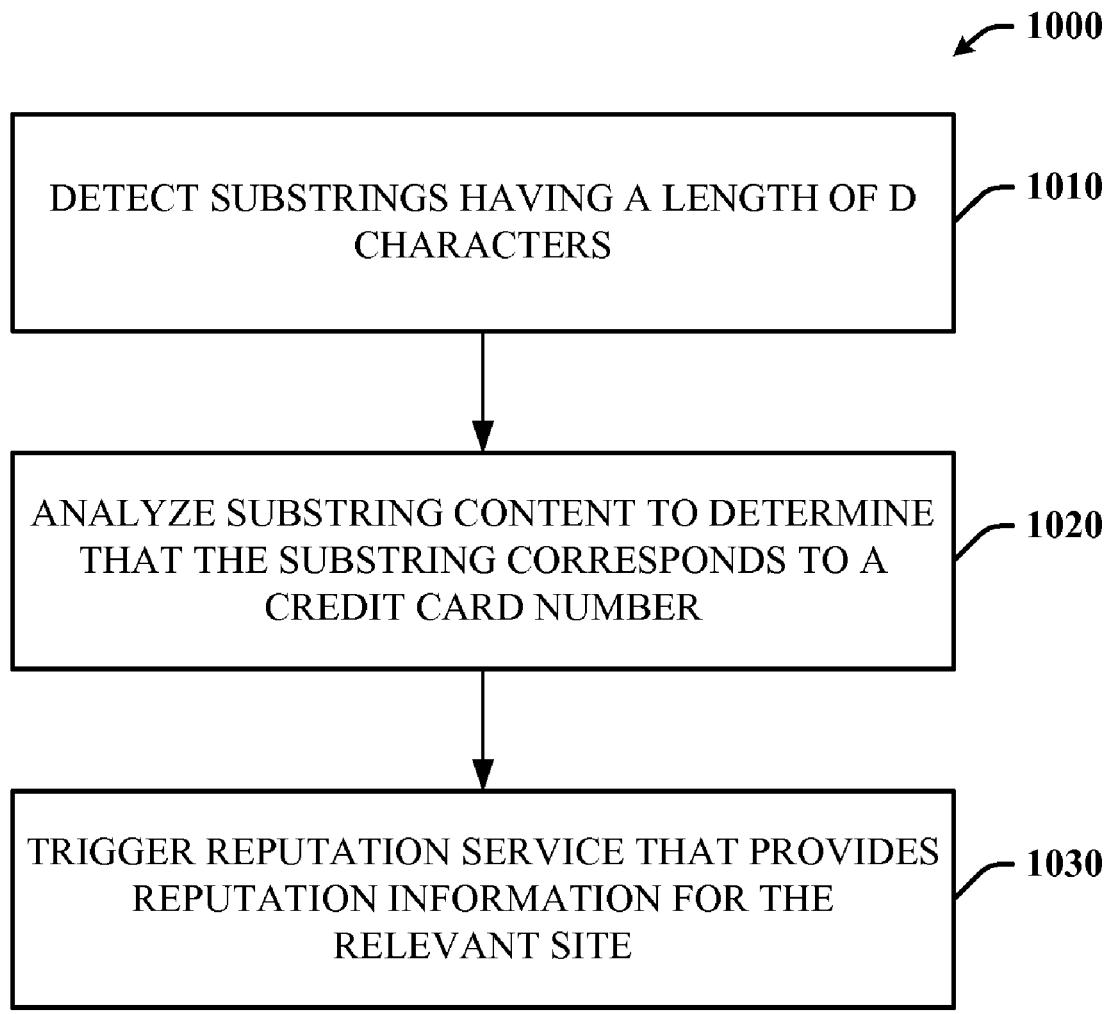
FIG. 10 is a flow diagram illustrating an exemplary methodology that facilitates the monitoring and tracking of PII data and the employment of on-demand site or merchant trust verification in response to the detection of certain character string data.

Certain web form fields can also be identified as sensitive fields. This means that the character strings entered in the sensitive fields can receive special treatment in the digest or can trigger a particular action by the system. Entering data into a credit card field can automatically trigger a reputation service to provide the reputation information for the current site or merchant. FIG. 10 demonstrates a slightly different method for triggering the reputation service.

In FIG. 10, there is a flow diagram illustrating an exemplary method 1000 that facilitates the monitoring and tracking of PII data and the employment of on-demand site or merchant trust verification in response to the detection of certain character string data. The method 1000 involves detecting numeric substrings having a length of d characters (e.g., 16) at 1010 and determining that the numeric string represents a credit card number at 1020. Upon the detection of a credit card number or some other type of character string that indicates a financial transaction is about to take place between the user and the site or merchant, a reputation service can be triggered at 1030 that can provide on-the-spot or on-demand site or merchant reputation information either before or after any other information is communicated to the merchant or site.

The systems and methods as described above can operate in a browser environment as a plug-in or browser helper object (BHO). Alternatively, they can operate as a separate application from the browser.

Furthermore, the subject systems and/or methods can incorporate various inference schemes and/or techniques in connection with recognizing and identifying sensitive user information including but not limited to PII data. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As also used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer readable storage medium that facilitates automatic tracking of user data and monitoring personally identifiable information (PII) comprising:
   a keystroke capture component that captures keystrokes in the form of a character string;
   an extraction component that extracts one or more character substrings having at least a minimum length of characters from the character string;
   a field extraction component that extracts field character string data from one or more form fields provided by a virtual network location and associates the character string data with respective metatag labels;
   an input tracking component that tracks substrings which repeat at least q times over a period of time;
   a string analysis component that flags a character substring as PII based on the minimum length of characters, the number of substring repetitions or metadata associating the substring with a person, wherein the PII uniquely distinguishes a person's data from other personal data stored at the virtual network location; and
   a display component that provides a visualization of the extracted substrings that is browsable and searchable;
   wherein a list of substrings is viewable based upon time of entry and the virtual network location where the PII was received.

2. The system of claim 1, wherein the keystroke capture component captures the keystrokes for a designated period of time.

3. The system of claim 1, wherein the character string is a long, continuous string.

4. The system of claim 1, wherein the extraction component locates and extracts one or more repeating character substrings with at least a minimum character length that repeat at least one time.

5. The system of claim 1 is embedded in a browser.

6. The system of claim 1 further comprises one or more data stores that collect extracted field character string data.

7. The system of claim 6 further comprises a count component that incrementally increases a count of the relevant extracted field character string data as each new occurrence is observed.

8. The system of claim 1 further comprises a reputation service that is triggered to retrieve on-demand site or merchant reputation data when input is entered into at least one sensitive form field.

9. The system of claim 1, further comprising a string analysis component that analyzes the character substrings extracted from the character string to determine a frequency of occurrence for each extracted character substring.

10. The system of claim 9, further comprising an order component that orders the extracted character substrings according to at least one parameter comprising the frequency of occurrence.

11. The system of claim 10, the at least one parameter further comprises date of entry, alphabetical order, numerical order or location of entry.

12. The system of claim 1, further comprising an input monitor component that monitors and captures input entered into an active browser in the form of the character string or a second character string.

13. The system of claim 12, the extraction component extracts the character substrings from the character string or second character string comprising the captured input.

14. A method in a computer comprising instructions that facilitates automatic tracking of personally identifiable information (PII) comprising:
   employing a processor of the computer to implement the following computer-readable instructions:
   capturing keystrokes entered into an active web browser as a continuous string of characters;
   extracting one or more character substrings having at least a minimum length of characters from the character string;
   capturing input entered into a web form field;
   extracting field character string data from the input and associating a substring of the character string data with respective metatag labels;
   analyzing the string of characters in order to find one or more substrings that repeat;
   tracking and maintaining a record of virtual network locations where personally identifiable information has been entered;
   flagging a character substring as PII based on the minimum length of characters, the number of substring repetitions or metadata associating the substring with a person, wherein the PII uniquely distinguishes a person's data from other personal data stored at the virtual network location; and
   allowing a list of substrings to be viewed and selected based upon time of entry and the virtual network location where the substring was received.

15. The method of claim 14 further comprises arranging the one or more repeating substrings by frequency of occurrence.

16. The method of claim 14 further comprises determining a context of the one or more repeating substrings.

17. The method of claim 14 further comprises monitoring and tracking user input as entered, the user input comprising repeating and non-repeating substrings.

18. The method of claim 17 further comprises triggering a reputation service to obtain site or merchant reputation data when at least one of the following occurs: at least a portion of the user input indicates a financial transaction or the user input entered into at least one sensitive field.

19. The method of claim 14 further comprises extracting field character strings from respective web form fields; and increasing respective counts of the field character strings as additional occurrences thereof are observed.

20. A system embodied on a computer readable storage medium that facilitates automatic tracking of user data comprising:
   means for capturing keystrokes in the form of a character string;
   means for extracting one or more character substrings having at least a minimum length of characters from the character string;
   means for capturing input entered into a web form field;
   means for extracting field character string data from the input and associating a substring of the character string data with respective metatag labels;
   means for analyzing the character substrings extracted from the character string to determine a frequency of occurrence for each extracted character substring;
   means for ordering the extracted character substrings according to at least one parameter comprising the frequency of occurrence;
   means for flagging a character substring as personally identifiable information based on the minimum length of characters, the number of substring repetitions or metadata associating the substring with a person, wherein the personally identifiable information uniquely distinguishes a person's data from other personal data maintained in a data store associated with a network address location;

means for tracking and maintaining a record of network address locations where personally identifiable information has been entered into a browser; and means for allowing a list of substrings to be viewed and selected based upon time of entry and the website where the substring was entered.

* * * * *